United States Patent
Sattinger (10) Patent No.: US 7,464,552 B2
(45) Date of Patent: Dec. 16, 2008

(54) ACOUSTICALLY STIFFENED GAS-TURBINE FUEL NOZZLE

(75) Inventor: Stanley S. Sattinger, McDonald, PA (US)

(73) Assignee: Siemens Energy, Inc., Orlando, FL (US)

( * ) Notice: Subject to any disclaimer, the term of this patent is extended or adjusted under 35 U.S.C. 154(b) by 857 days.

(21) Appl. No.: 10/884,467

(22) Filed: Jul. 2, 2004

(65) Prior Publication Data
US 2006/0000220 A1   Jan. 5, 2006

(51) Int. Cl.
*F02C 7/24* (2006.01)
(52) U.S. Cl. .......................................... 60/725; 60/734
(58) Field of Classification Search ............... 60/725, 60/734, 39.464, 785, 751, 782, 795; 415/144, 415/145; 181/214
See application file for complete search history.

(56) References Cited

U.S. PATENT DOCUMENTS

| | | | |
|---|---|---|---|
| 3,987,633 A * | 10/1976 | Ford, Jr. | ............... 60/671 |
| 4,173,122 A | 11/1979 | Wilkinson | |
| 4,546,733 A | 10/1985 | Fukami et al. | |
| 5,123,835 A | 6/1992 | Richards et al. | |
| 5,353,598 A | 10/1994 | Huck et al. | |
| 5,373,695 A | 12/1994 | Aigner et al. | |
| 5,791,889 A | 8/1998 | Gemmen et al. | |
| 5,809,769 A | 9/1998 | Richards et al. | |
| 6,058,709 A | 5/2000 | Richards et al. | |
| 6,082,108 A | 7/2000 | Scheidl et al. | |
| 6,205,764 B1 | 3/2001 | Hermann et al. | |
| 6,370,879 B1 | 4/2002 | Stalder et al. | |
| 6,430,933 B1 | 8/2002 | Keller | |
| 6,530,221 B1 | 3/2003 | Sattinger et al. | |
| 6,546,729 B2 | 4/2003 | Hellat et al. | |
| 6,634,457 B2 | 10/2003 | Paschereit et al. | |

FOREIGN PATENT DOCUMENTS

| | | |
|---|---|---|
| GB | 2 381 832 A | 5/2003 |
| JP | 09004541 A | 1/1997 |
| WO | WO 93/10401 A1 | 5/1993 |

* cited by examiner

*Primary Examiner*—Devon Kramer
*Assistant Examiner*—Vikansha Dwivedi (57) ABSTRACT

Under certain conditions, the fuel delivery system can contribute to the formation of strong dynamic pressures in the combustor of a turbine engine. Embodiments of the invention provide a system for dynamically stiffening the fuel supply passage to suppress damaging combustion dynamics. To that end, a Helmholtz resonator can be placed along and in branched relation to the fuel supply passage. The resonator can produce the effect of adding a pressure release opening at a selected location in the fuel line, causing a shift in the fuel line pressure wave pattern that blocks fuel flow fluctuations at the outlet of the fuel passage at the frequency of the oscillation. The pressure wave shift results in a shifting of the volume velocity wave pattern. Ideally, the resonator can be positioned along the flow path such that the volume velocity of the fuel at the fuel passage exit is minimized.

15 Claims, 8 Drawing Sheets

FIG. 10B

ACOUSTICALLY STIFFENED GAS-TURBINE FUEL NOZZLE

FIELD OF THE INVENTION

The invention relates in general to turbine engines and, more specifically, to an acoustically stiffened fuel nozzle for a turbine engine.

BACKGROUND OF THE INVENTION

Although often associated with dry low-NOx combustors used in some gas turbine engines, strong dynamic pressures due to combustion oscillations or pulsations have also occurred in diffusion-flame type combustors when operated on natural gas fuel. In the past, these pulsations have occurred during engine startup operation at or near full-speed, no-load conditions. These pulsations can reach potentially damaging amplitudes, but they remain at these levels for relatively short periods of time during engine startup.

These combustion oscillations have been attributed to fuel flow fluctuations that are induced by dynamic pressures under the low steady flows of fuel at no-load conditions, during which the fuel nozzles are acoustically "soft" (i.e., when the fuel nozzles have low acoustic resistance). These flow fluctuations, in turn, give rise to the burn-rate fluctuations that produce the associated pressure fluctuations.

These pressure pulsations are not limited to no-load conditions. For example, strong dynamic pressures at full-load conditions have occurred in turbine engines with diffusion-type combustors. Normally, pressure pulsations would not be expected under full-load operation because the full-load fuel flow rate is approximately five times greater than the no-load flow rate. Thus, the fuel nozzles would have a higher acoustic resistance at full-load than at no-load. However, experience has demonstrated that combustion oscillations can still occur at full-load.

There are strong indications that the fuel delivery system participates in the combustion dynamics under no-load conditions. It has been observed that these pulsations in the combustor and in the fuel feed line share a common excitation source; other analyses performed on this data suggest that this pressure pulsation source is the combustor. Further study reveals that, even under operating conditions where fuel flow fluctuations due to combustor dynamic pressures are expected to be suppressed, acoustic communication between the combustors and their feed lines is still strong. Thus, there is a need for the nozzle to be dynamically stiffened at the frequency of these fluctuations.

SUMMARY OF THE INVENTION

In one aspect, embodiments of the invention are directed to an acoustically stiffened fuel supply system for a turbine engine. The system includes at least one turbine engine combustion chamber, a fuel supply passage, and a resonator assembly branching from and disposed along the fuel supply passage. The combustion chamber can be part of a diffusion-type combustor.

A pressurized gas fuel is received within the fuel supply passage. The fuel in the passage has an associated volume velocity wave and an associated pressure wave. The pressure wave is substantially 90 degrees out of phase with the volume velocity wave. The passage has an outlet adapted to discharge fuel into the combustion chamber. The resonator assembly shifts the pressure wave in the fuel supply passage such that a pressure antinode occurs substantially at the outlet. As a result, the volume velocity wave amplitude of the fuel is reduced at the passage outlet such that the combustion oscillations in the combustor that are attributable to the fuel line are suppressed. In one embodiment, the volume velocity wave amplitude can be reduced to substantially zero at or near the outlet.

In one embodiment, the fuel supply passage can be defined by at least a fuel supply line and a fuel nozzle. The fuel nozzle can be located downstream of the fuel supply line. Further, the fuel nozzle can have a discharge face that defines the outlet of the fuel flow passage. The resonator assembly can be provided between the fuel supply line and the fuel nozzle. Alternatively, the resonator assembly can be located in the fuel supply line upstream of the fuel nozzle.

The resonator assembly can include a t-shaped pipe, a plug and a housing. The t-shaped pipe can have opposing inlet and outlet ends and a branch end disposed therebetween. The branch end can be substantially perpendicular to the inlet and outlet ends. The branch end can be closed by the plug. At least a portion of the plug can be received within the branch end. The plug can have a plurality of openings therein. The plug can have an inner surface and an outer surface. At least one baffle can extend from the inner surface to help reduce grazing flow of fuel over the inner surface of the plug.

The housing encloses at least a portion of the branch end so as to define a volume therebetween. The openings in the plug can permit fluid communication between the pipe and the volume.

Embodiments of the invention are also directed to a method of reducing combustion oscillations in a turbine engine. The method involves operating a turbine engine with a combustion chamber and at least one fuel supply passage having an outlet adapted to discharge fuel into the combustion chamber. Pressurized fuel is passed through the fuel supply passage, and the fuel travels through the passage at a velocity according to a velocity volume wave. The method further includes the step of minimizing the amplitude of the velocity volume wave of the fuel substantially at the passage outlet. As a result, the fuel passage-induced oscillations in the combustor can be suppressed.

It should also be noted that the fuel in the passage can also have an associated pressure wave. The pressure wave can be substantially 90 degrees out of phase with the volume velocity wave. Thus, the step of minimizing the amplitude of the volume velocity wave of the fuel can be done by shifting the pressure wave such that a pressure antinode occurs at or near the passage outlet. Consequently, the volume-velocity wave shifts so that a velocity node occurs substantially at the passage outlet. The step of shifting the pressure wave can be accomplished by placing a resonator along and in branched relation to the fuel supply passage.

Embodiments of the invention are further directed to a resonator assembly for a turbine engine fuel supply line. The assembly includes a t-shaped pipe, a plug, and a housing. The t-shaped pipe has opposing inlet and outlet ends and a branch end disposed between the inlet and outlet ends. The branch end can be substantially perpendicular to the inlet and outlet ends. The inlet and outlet ends of the t-shaped passage can be adapted for fluid connection to a fuel passage.

The plug closes the branch end. The plug has a plurality of openings therein. At least a portion of the plug can be received within the branch end. The plug can include an inner surface and an outer surface. The inner surface can have one or more baffles extending therefrom that can reduce grazing fuel flow over the inner surface of the plug. The openings in the plug can be offset from the baffle. Further, the openings in the plug can be configured to provide acoustic stiffening at a specified frequency.

The housing encloses at least a portion of the branch end so as to define a volume therebetween. The openings in the plug permit fluid communication between the pipe and the volume. In one embodiment least a portion of the housing can be thermally insulated.

DETAILED DESCRIPTION OF EMBODIMENTS OF THE INVENTION

Embodiments of the present invention address the susceptibility of prior turbine engine fuel flow passages to pressure pulsations. According to embodiments of the invention, a fuel supply passage and/or nozzle can be acoustically stiffened against the action of pressure pulsations at the frequency where these oscillations tend to occur. Embodiments of the invention will be explained in the context of one possible system, but the detailed description is intended only as exemplary. Embodiments of the invention are shown in FIGS. 1-10B, but the present invention is not limited to the illustrated structure or application.

Embodiments of the invention can be applied to any of the fuel flow passages 10 in turbine engines, particularly those with diffusion-type combustors. One skilled in the art will readily appreciate the various turbine engines that can fall into these broad categories. Each engine will have one or more fuel flow passages 10 through which a fuel can be provided for the purposes of combustion. In one diffusion-type combustion system, there can be a total of 16 combustors, and each combustor can have a dedicated fuel supply passage. Potentially each of these fuel flow passages is susceptible to pressure pulsations. Thus, one or more of these fuel flow passages can be configured in accordance with embodiments of the invention.

Figure 1:
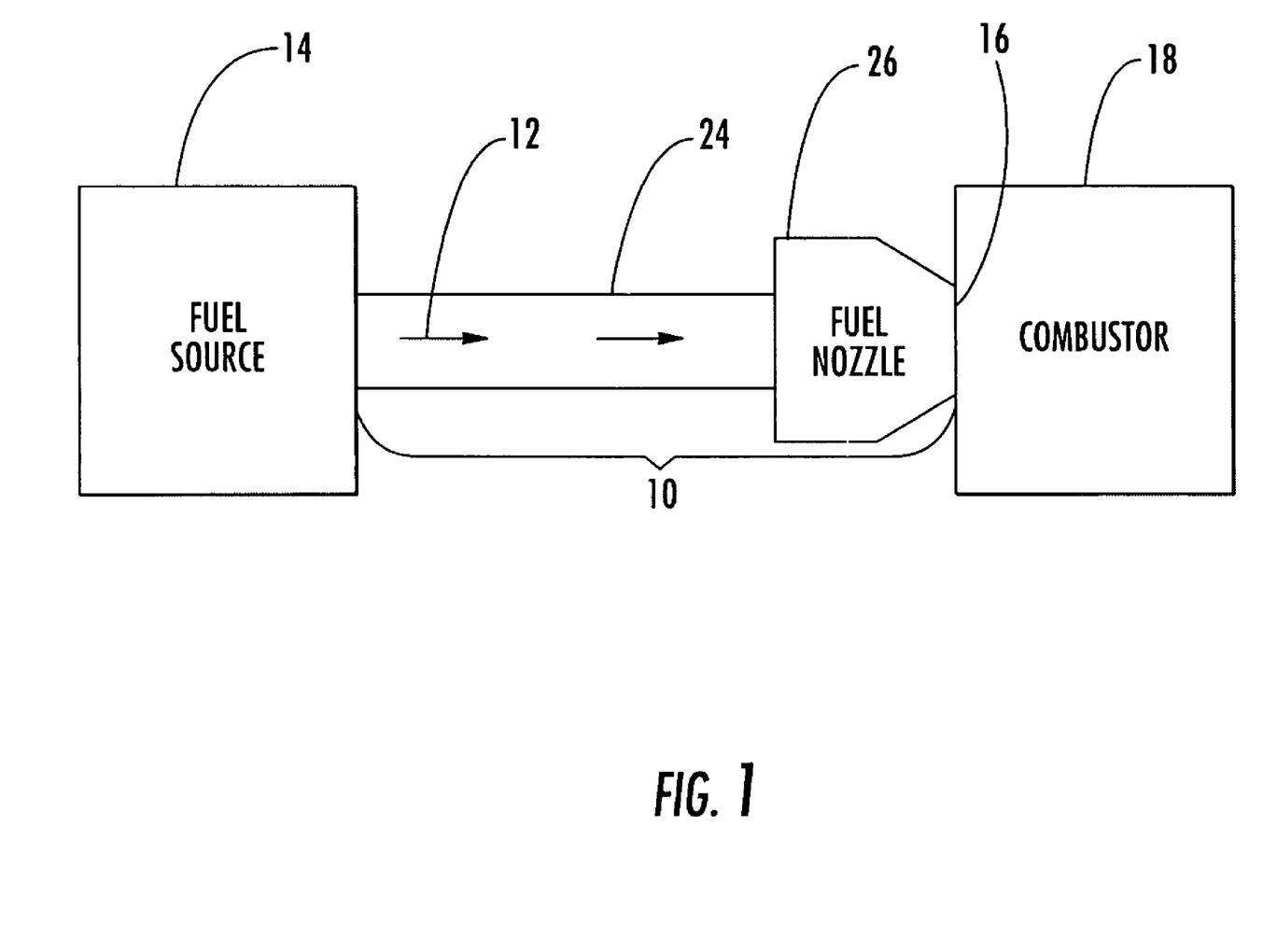
FIG. 1 is a diagrammatic view of a fuel supply system for a combustor according to embodiments of the invention.

As shown in FIG. 1, the fuel supply passage 10 can be configured to receive a pressurized fuel 12 from a fuel source 14. The fuel supply passage 10 can be substantially straight or it can include one or more bends or curves. The fuel flow passage 10 can have a substantially constant cross-sectional area or it can vary along the length of the passage 10. The fuel flow passage 10 can have an outlet 16 adapted for fluid communication with the combustor 18. In one embodiment, the fuel flow passage 10 can inject fuel directly into the combustion chamber 18.

The actual hardware forming the fuel flow passage 10 can vary from engine to engine, and embodiments of the invention are not limited to any specific hardware. In one embodiment, the fuel flow passage 10 can be defined by at least a fuel supply or feed line 24 and a fuel nozzle 26. In such case, the fuel nozzle 26 can be downstream of the fuel supply line 24. Further, the fuel nozzle 26 can be configured to eject the fuel 12 from the fuel flow passage 10 into the combustion chamber 18. In such case, the outlet 16 of the fuel flow passage 10 can be the discharge face of the fuel nozzle 26.

Figure 2:
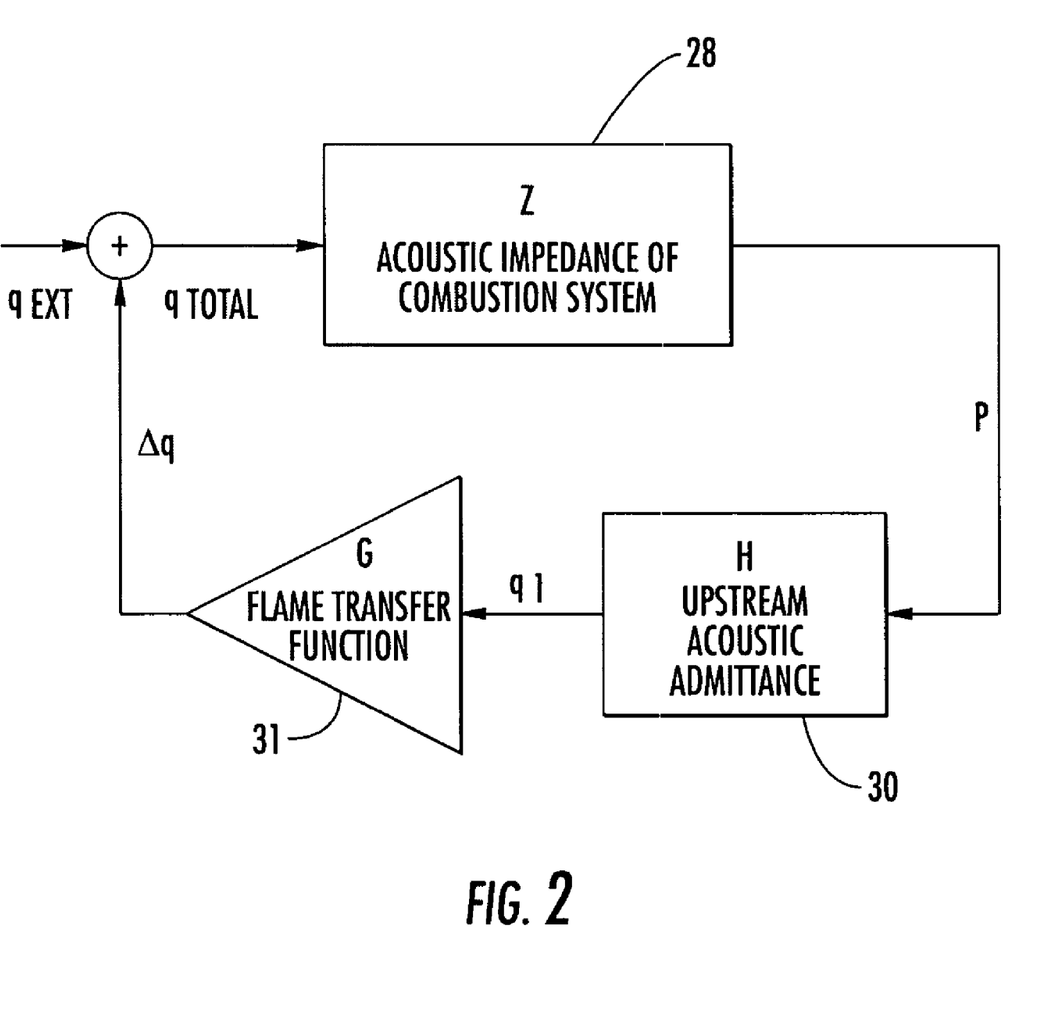
FIG. 2 is a flow chart showing the dynamic feedback mechanism that can give rise to combustion oscillations.

FIG. 2 shows the dynamic feedback loop that can give rise to combustion oscillations. As can be seen, combustion oscillations can arise due to certain combinations of the acoustic impedance of the combustion system 28, the upstream acoustic admittance 30 of the fuel flow passage 10, and the flame transfer function 31. Many prior attempts at reducing combustion dynamics focused on treating the oscillations within the combustor 18 itself—that is, the acoustic impedance of the combustion system 28. In contrast, embodiments of the invention seek to suppress combustor oscillations by addressing the upstream acoustic admittance 30 in one or more of the fuel flow passages 10. Before describing the ways in which modifications to the upstream acoustic admittance 30 can be accomplished, mention must be made of a few characteristics of the fuel flow passage 10 and the pressurized fuel 12 passing therethrough.

Figure 3A:
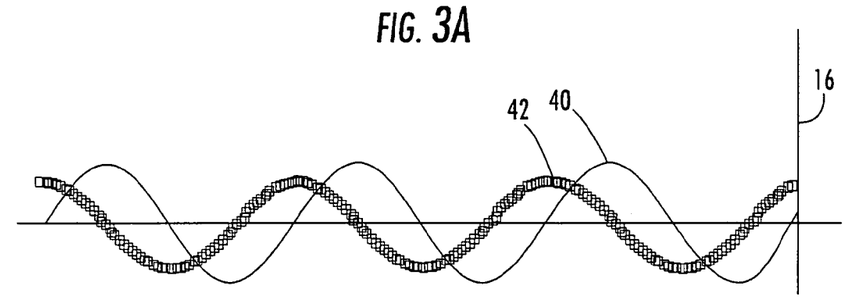
FIG. 3A shows the pressure and volume-velocity wave patterns in a fuel passage that is not acoustically stiffened according to embodiments of the invention.

Embodiments of the invention are especially suited for gas fuels 12. The pressurized fuel 12 flowing through the passage 10 can have an associated volume-velocity fluctuation and an associated pressure fluctuation. The volume-velocity fluctuation of the fuel flow can be defined as the acoustic particle velocity times the cross-sectional area of the flow passage 10. The acoustic particle velocity of the fuel 12 is not constant as it travels through the flow passage 10; therefore, the volume-velocity fluctuation of the fuel is not constant. Similarly, the pressure fluctuation of the fuel 12 is not constant along the length of the fuel flow passage 10. Indeed, both the volume-velocity and the pressure fluctuation in the fuel generally follow a wave-like pattern. FIG. 3A shows a simplified example of the pressure wave 40 and the volume-velocity wave 42 within a uniform duct. The pressure wave 40 is always 90 degrees out of phase with the volume-velocity wave 42.

The susceptibility of a given fuel line 10 to pressure pulsations in the combustor can be measured in terms of the acoustic admittance of the fuel passage 10. Acoustic admittance can be defined as the volume-velocity amplitude of fuel-flow fluctuation through the flow passage outlet (fuel nozzle discharge face) 16 per unit of combustor pressure oscillation at the face of the outlet 16. Admittance is a complex quantity having both magnitude and phase components.

In prior fuel flow passages 10, the volume-velocity of the fuel 12 can be relatively high at the outlet 16 of the fuel passage 10 if a pressure node falls at or near that location at some frequency, as shown in FIG. 3A. Thus, the acoustic admittance of the fuel passage 10 can be high, making the passage susceptible to pressure pulsations, which, in turn, can contribute to large combustion oscillations in the combustor 18. The combustion oscillations stemming from the fuel passage 10 can be diminished by reducing the amplitude of the volume-velocity wave of the fuel 12 exiting the fuel supply passage 10, preferably to substantially zero, or otherwise making the admittance as small as possible.

Again, embodiments of the invention seek to reduce the admittance of the fuel passage 10 substantially at the outlet 16. There are a variety of ways that the acoustic admittance can be reduced. In one embodiment, the acoustic admittance can be minimized by shifting the pressure wave 40 in the fuel passage 10 such that a pressure antinode falls at or proximate to the outlet 16 of the passage 10. As a result, the volume-velocity wave 42 can shift as well. Being 90 degrees out of phase with the pressure wave 40, the volume-velocity wave 42 will be substantially reduced, preferably to zero, at or proximate to the passage outlet 16. In other words, the ultimate goal is to reduce the amplitude of the volume-velocity wave of the fuel 12 exiting the passage 10 to as small an amplitude as possible. In one embodiment, aspects of the invention seek to minimize the amplitude of the volume-velocity wave 42 at the discharge face 16 of the fuel nozzle 26. By reducing admittance of the fuel passage 10, the problems of fuel-line related oscillations can be suppressed.

One way of shifting the pressure wave 40 in the fuel passage 10 is by providing at least one resonator along the fuel flow passage 10. The resonator can be a Helmholtz resonator. Unlike prior uses of resonators in turbine engines for acoustic damping, a resonator according to embodiments of the invention can be used solely to produce the effect of wave shifting.

Helmholtz resonators are well known in the art and a variety of resonators fall within the scope of the invention. Examples of resonator assemblies in accordance with embodiments of the invention are shown in FIGS. 4-6 and 8-10. In one embodiment, a resonator assembly 48 can be a generally t-shaped hollow pipe 50 having an inlet end 52, an outlet end 54, and a branch end 56. The inlet and outlet ends 52, 54 can be substantially axially aligned or they can be offset, but, in any case, they can be in fluid communication with each other. The inlet and outlet ends 52, 54 can be substantially open and can be adapted for fluid connection along the fuel supply passage 10. In one embodiment, at least one of the inlet end 52 and outlet end 54 can include a mounting flange 60 for connection to the fuel nozzle 26, such as by bolts. Alternatively, the inlet and outlet ends 52, 54 can provide threads or quick connects/disconnects, just to name a few possibilities. The internal passage 62 of the resonator assembly 48 can have any of a number of cross-sectional shapes. For example, the internal passage 62 of the resonator assembly 48 can be substantially identical to the fuel flow passage 10 to which it connects. In one embodiment, the resonator passage 62 is substantially circular.

Figure 4:
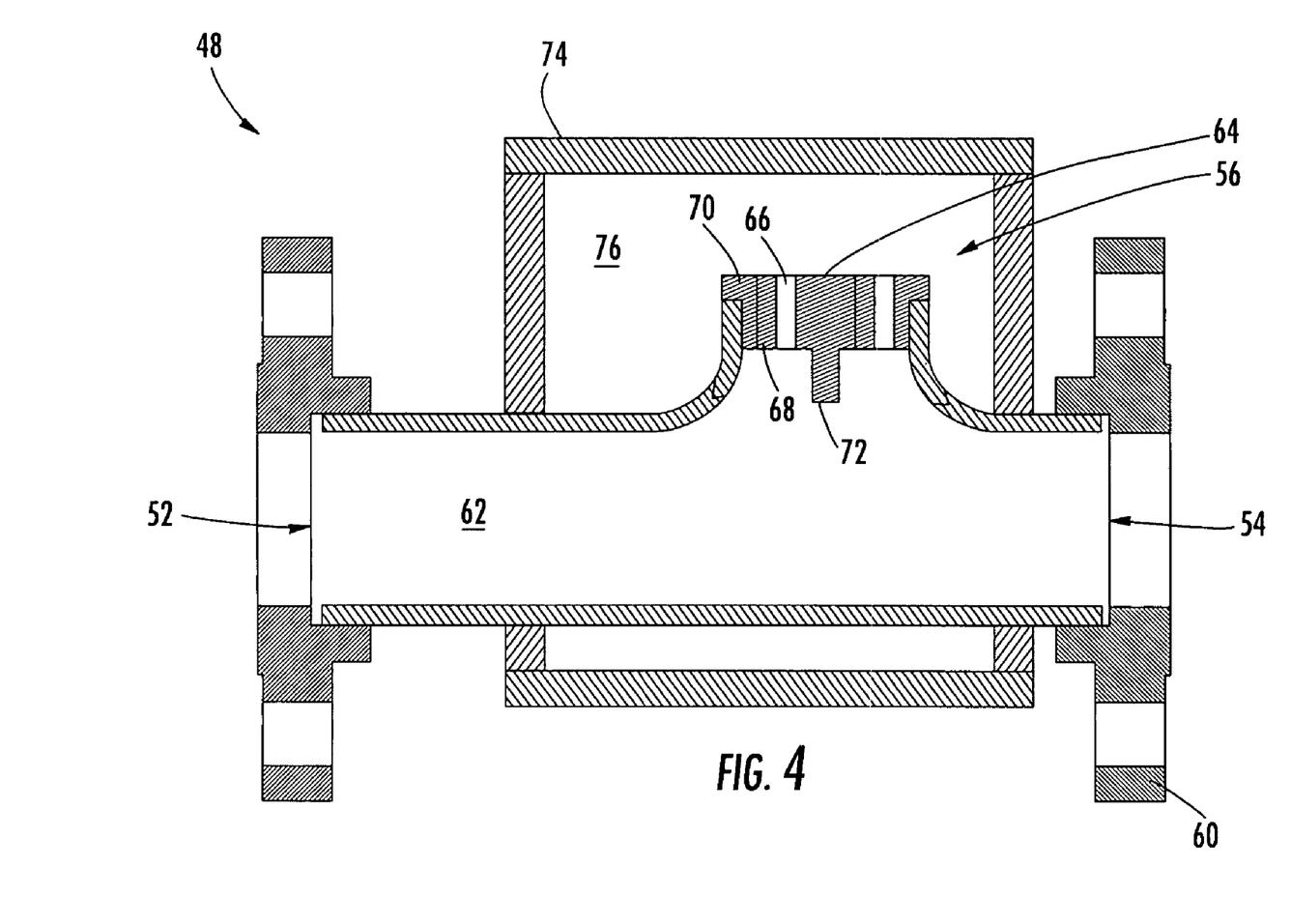
FIG. 4 is a cross-sectional view of a resonator assembly according to embodiments of the invention.
Figure 5:
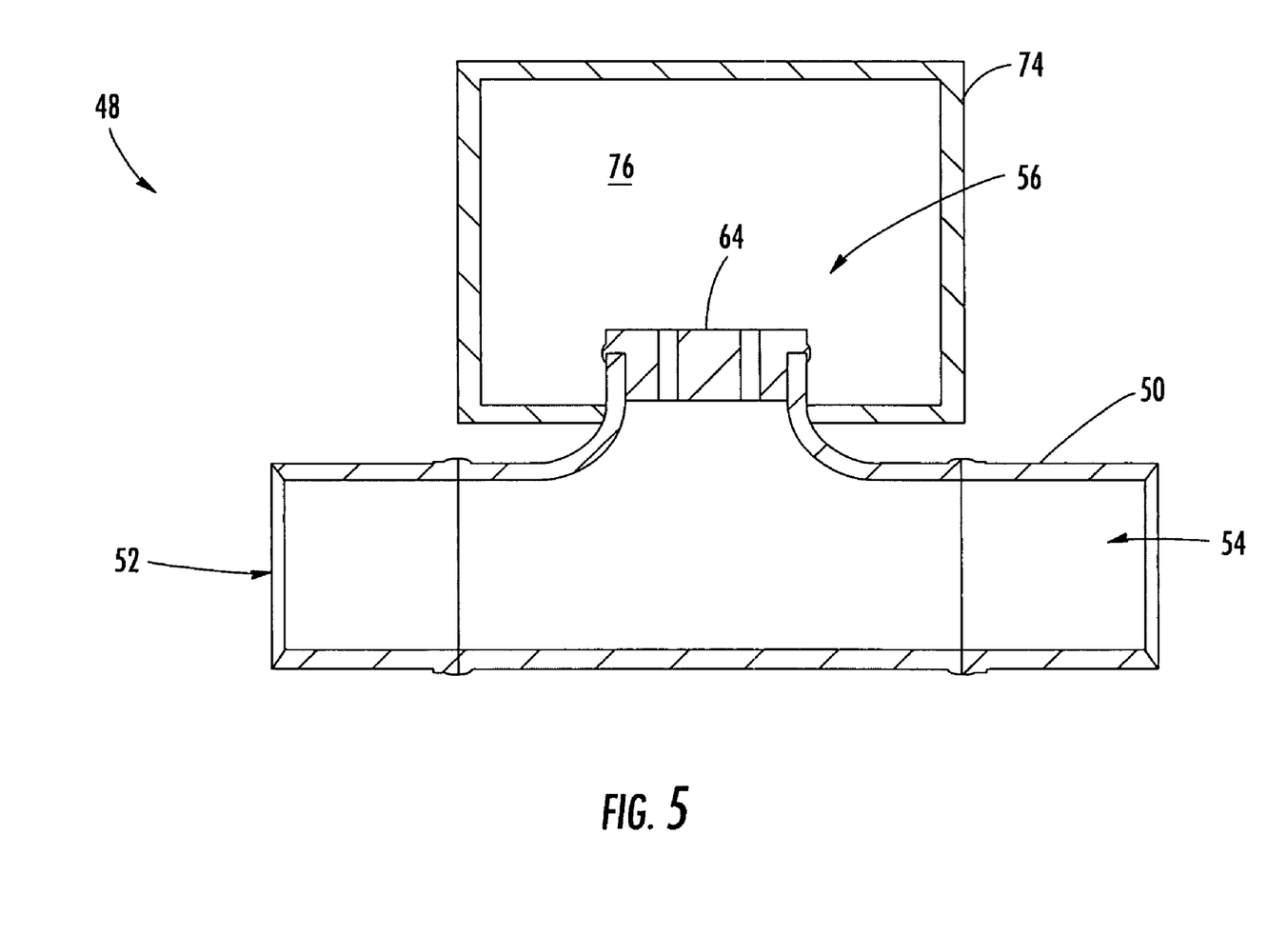
FIG. 5 is a cross-sectional view of an alternative resonator assembly according to embodiments of the invention, showing the housing enclosing only the branch end of the resonator.
Figure 6:
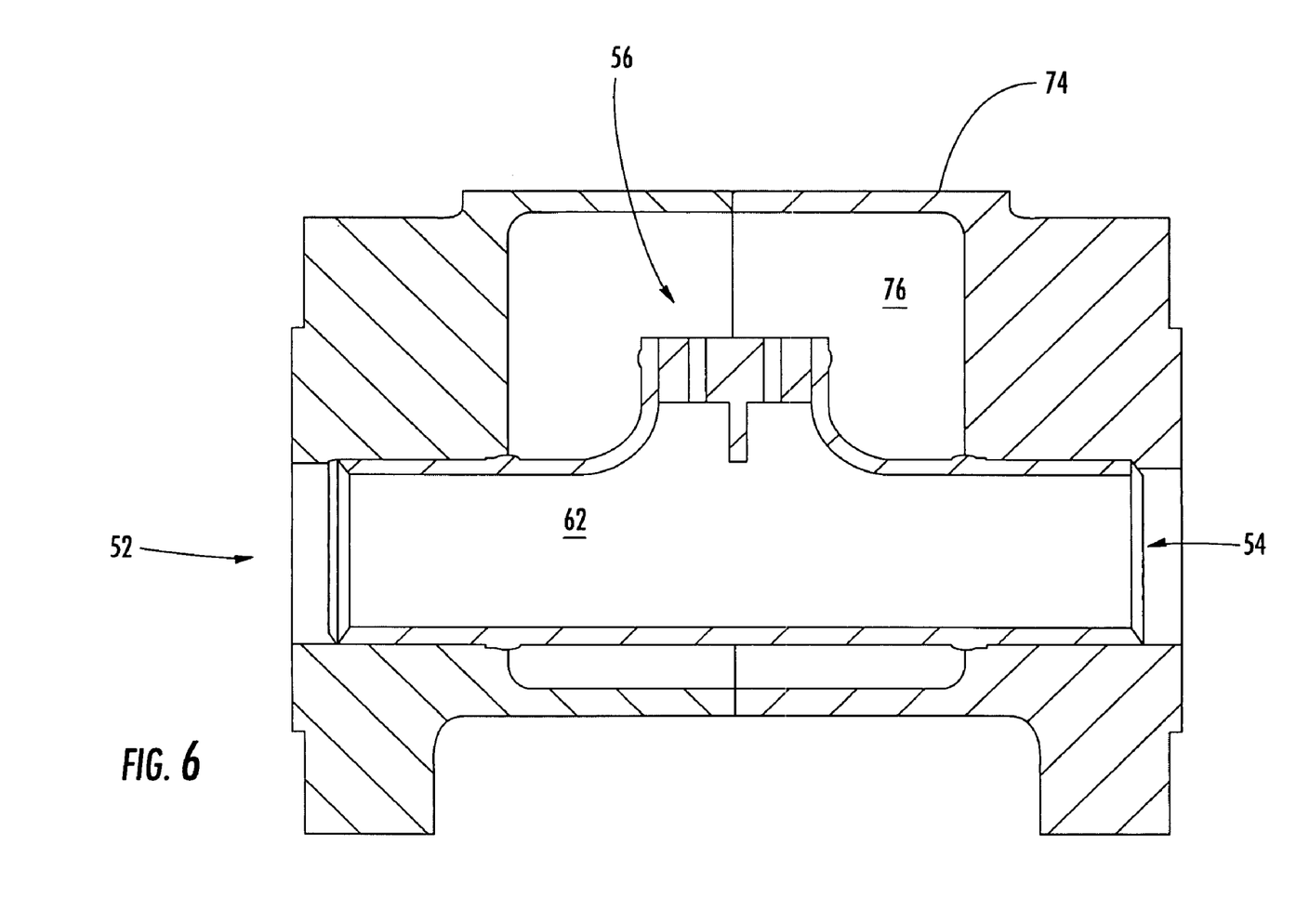
FIG. 6 is a cross-sectional view of an alternative resonator assembly according to embodiments of the invention, showing the housing enclosing a substantial portion of the t-shaped pipe.
Figure 7:
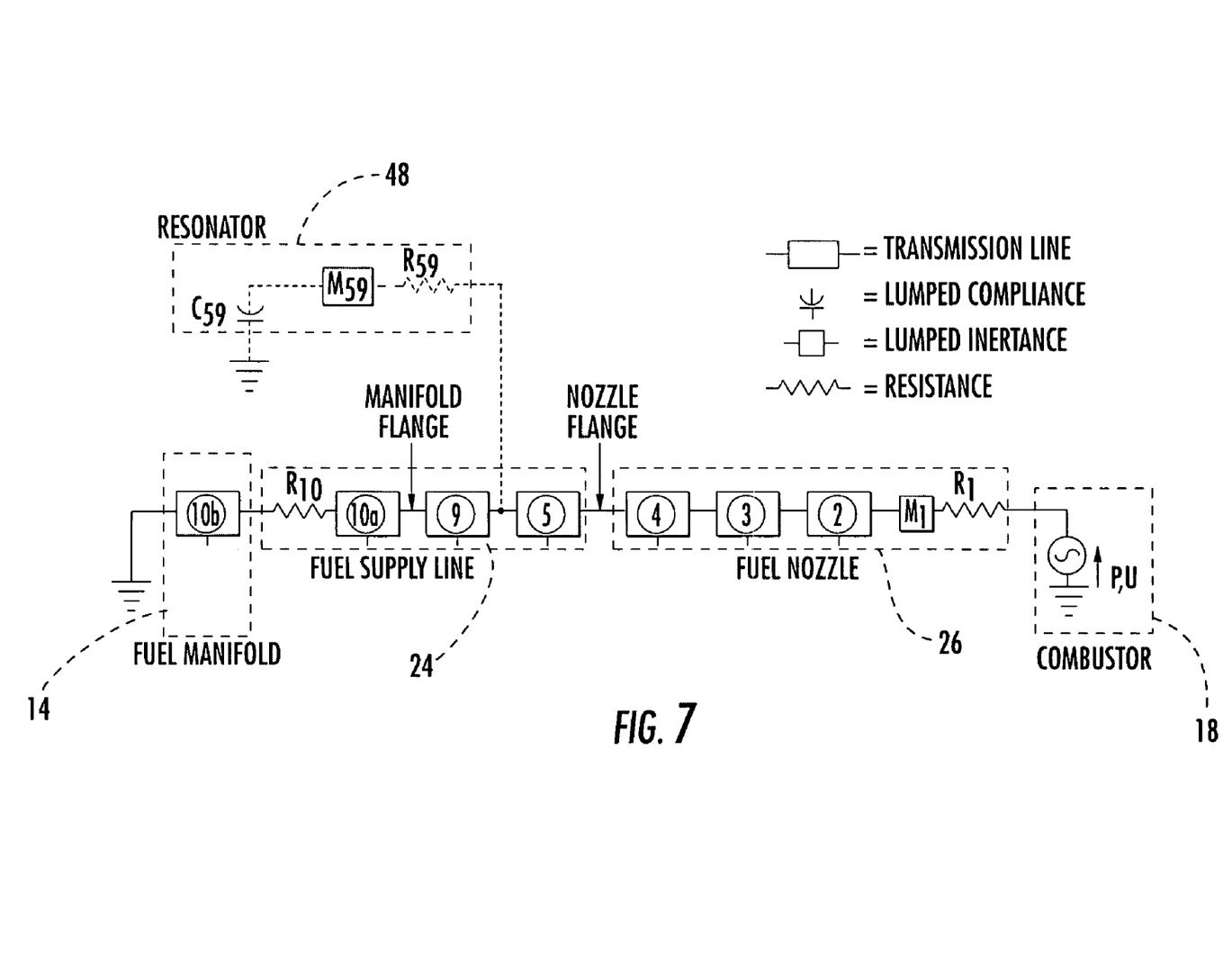
FIG. 7 is a partially schematic view of an acoustic model of one possible acoustically stiffened fuel passage according to embodiments of the invention.

The branch end 56 can be disposed between the inlet and outlet ends 52, 54. The branch end 56 can be substantially perpendicular to at least one of the inlet end 52 and the outlet end 54. The branch end 56 can be substantially closed by a plug 64. The plug 64 can reside over the branch end 56 or it can be received at least partially within the branch end 56, as shown in FIGS. 4-6. Ideally, the branch end 56 is long enough so that the plug 64 is located away from the inner passage 62 of the t-pipe 50. The plug 64 can be secured to the branch end 56 in any of a number of ways including welding, brazing, adhesives, or fasteners, just to name a few possibilities. The plug 64 and the t-shaped pipe 50 can be made of any of a number of materials including, for example, stainless steel.

The plug 64 can include a plurality of openings 66 therein. The quantity, size, shape, and spacing of the openings 66 can vary from application to application, and can be modified as needed to tune the resonator 48 to provide acoustic stiffening at a desired frequency or range of frequencies. These target frequencies can be set to generally correspond to the frequency of the pressure pulses experienced in the combustor 18 and may vary based on the prevailing operating conditions. The openings 66 can be substantially identical to each other in any of the above respects. It is preferred if the openings 66 are substantially circular. Further, the openings 66 can be provided according to a pattern.

Figure 8A:
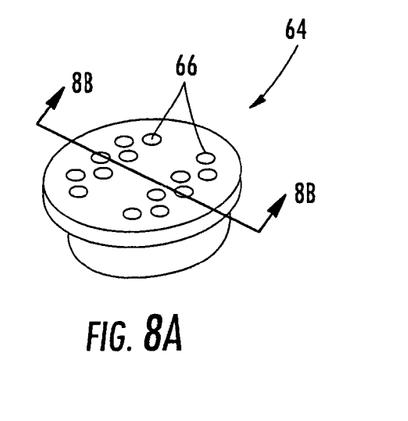
FIG. 8A is an isometric view of a first plug according to embodiments of the invention.
Figure 8B:
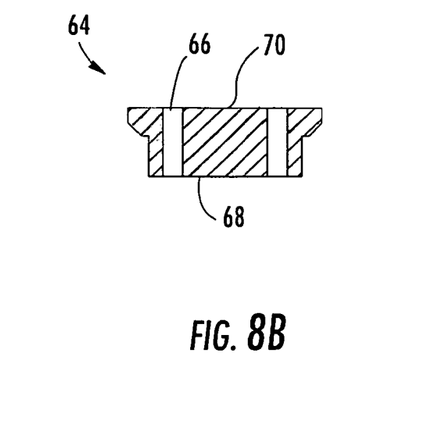
FIG. 8B is a cross-sectional view of the first plug according to embodiments of the invention, taken along line 8B-8B in FIG. 8A.
Figure 9A:
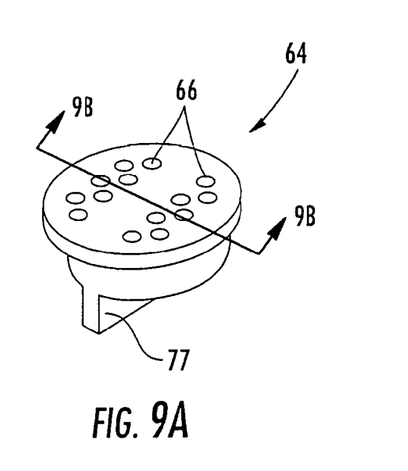
FIG. 9A is an isometric view of a second plug according to embodiments of the invention.
Figure 9B:
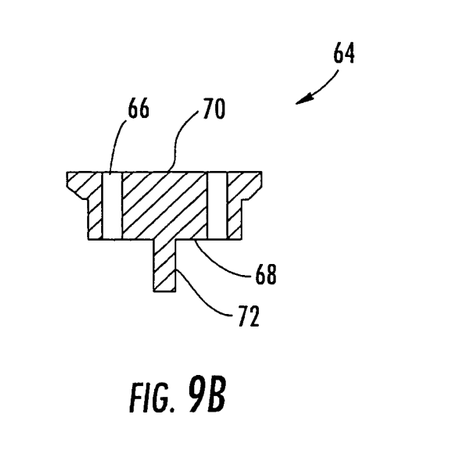
FIG. 9B is a cross-sectional view of the second plug according to embodiments of the invention, taken along line 9B-9B in FIG. 9A.
Figure 10A:
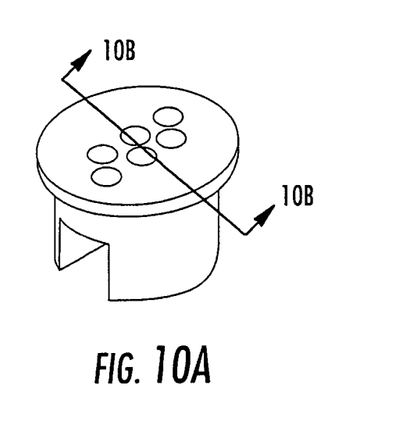
FIG. 10A is an isometric view of a third plug according to embodiments of the invention.
Figure 10B:
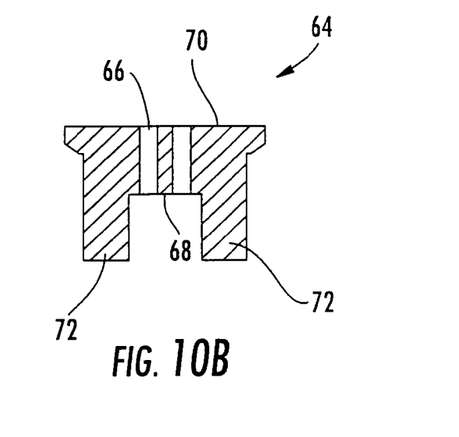
FIG. 10B is a cross-sectional view of the third plug according to embodiments of the invention, taken along line 10B-10B in FIG. 10A.

The plug 64 can include an inner surface 68, which faces the interior 62 of the t-shaped pipe 50, and an outer surface 70. The inner surface 68 can be substantially flat, as shown in FIGS. 8A-8B. In some instances, the inner surface 68 can include a baffle 72. In one embodiment, the inner surface 68 can include a single baffle 72 extending therefrom, as shown in FIGS. 9A-9B. In another embodiment, there can be two baffles 72 extending from the inner surface 68, a shown in FIGS. 10A-10B. As will be explained in more detail later, the baffle 72 can reduce grazing flow over the inner surface 68 of the plug 64 to facilitate proper operation of the resonator 48. The openings 66 in the plug 64 can be offset from the baffle 72. The baffle 72 can be any shape and can be substantially perpendicular to the inner surface 68.

The resonator assembly 48 can further include a housing 74. The housing 74 can enclose at least a portion of the resonator assembly 48. At a minimum, the housing 74 can enclose a portion of the branch end 56, as shown in FIG. 5. In another embodiment, the housing 74 can enclose at least a portion of the rest of the resonator assembly 48 as well, as shown in FIGS. 4 and 6. Regardless of which portions of the t-shaped pipe 50 are enclosed with the housing 74, a volume 76 can be defined therebetween. The openings 66 in the plug 64 permit fluid communication between the interior 62 of the t-shaped pipe 50, through which the fuel 12 flows, and the volume 76.

The housing 74 can be made of any of a number of materials and, preferably, is made of the same material as the t-shaped pipe 50. If heated fuel is used, at least a portion of the housing 74 can be thermally insulated to minimize variations in the acoustic compliance of the fuel 12 within the volume 76. Thermal insulation can be achieved through use of any of a number of thermal insulating materials. The housing 74 can be connected to the t-shaped pipe 50 by any of a number of processes including welding or brazing. To facilitate assembly, the housing 74 can be a single component or it can be made of several components joined together around the t-shaped pipe 50.

It should be noted that, in any of the above-described resonator assemblies 48, the actual resonator is formed by the housing 74 and the plug 64 and possibly a portion of the branch end 56. The remainder of the t-shaped pipe 50 can merely facilitate installation along the fuel flow passage 10 such that the fuel 12 can flow through.

A resonator assembly 48 according to embodiments of the invention can be provided along the fuel supply passage 10 in any of a number of ways. For instance, the resonator assembly 48 can be placed in line with the fuel supply passage 10. In such case, the first and second ends 52, 54 can be fluidly connected to the fuel supply passage 10, as will be understood by one skilled in the art. For example, the first and second ends 52, 54 can be connected in-line with the flow passage 10. The resonator assembly 48 can be located along the fuel supply passage 10 in order to achieve a minimal admittance (preferably substantially zero) at or near the outlet 16 of the fuel passage 10 (discharge face of the fuel nozzle 26) and at the desired frequency by shifting the pressure wave-pattern 40. An acoustic model, such as the one shown in FIG. 7, can provide guidance by calculating the effect on nozzle admittance of placing the resonator 48 at various locations. Assuming the fuel passage 10 is formed by a fuel supply line 24 and a fuel nozzle 26, the resonator 48 can be positioned upstream of the fuel nozzle 26. In one embodiment, the resonator 48 can be located between the supply line 24 and the nozzle 26.

The operation of an acoustically stiffened fuel supply passage 10 according to embodiments of the invention will now be described. A pressurized fuel 12 can be supplied to the fuel flow passage 10 from a fuel manifold or other fuel source 14. When the pressurized fuel 12 encounters the resonator 48, a portion of the fuel can enter the volume 76 through the openings 66. A constant flow through the openings 66 and into the volume 76 is not intended; rather, the intended flow is oscillatory in and out of the volume 76.

As noted earlier, the plug 64 can include one or more baffles 72 on the inner surface 68. Without the baffle 72, some fuel would flow into the branch end 56 and stay attached to the interior walls of the branch end 56, altering the flow into or out of the volume 76 through the openings 66. Such grazing flow is undesirable because it can add damping and shifts the resonant frequency of the resonator assembly 48. The baffle 72 can block or decrease the amount of grazing flow across and transverse to the openings 66 in the plug 64. Further, as noted earlier, it is preferred if the plug 64 is located away from the interior 62 of the axial portion of the t-shaped pipe 50. Such remoteness of the plug 64 can further reduce grazing flow.

Figure 3B:
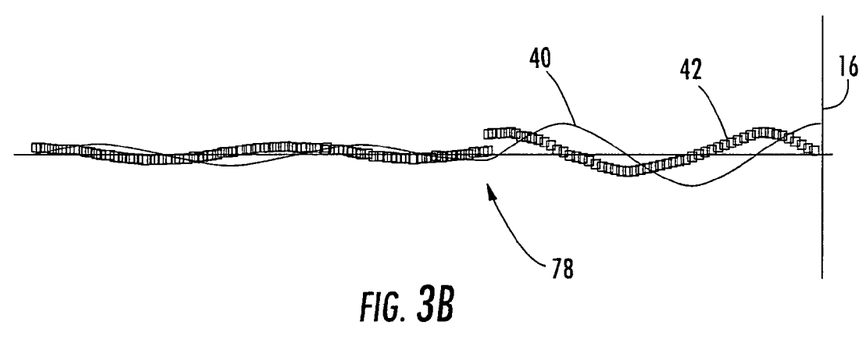
FIG. 3B shows the effect on the pressure and volume-velocity wave patterns in a fuel passage having a resonator according to embodiments of the invention.

The resonator assembly 48 can produce the effect of adding a pressure-release opening in the flow passage 10, thus causing a shift in the pressure wave 40 and a local disconnect 78 in the volume-velocity wave 42 as shown in FIG. 3B. As a result, there is a shift in both the fuel feed-line pressure-wave pattern 40 and the volume-velocity wave pattern 42. In the end, the fuel nozzle admittance is reduced, preferably to substantially zero, at the frequency of the damaging combustion oscillations. Thus, the operational feedback loop is broken such that the fuel flow 12 will not respond to pressure oscillations in the combustor 18. As shown, only the downstream portion of the fuel supply passage 10 is affected, but it is only the condition at the outlet 16 of the fuel passage 10 that is of concern.

The resonator 48 can be optimized for best performance under a certain set of operating conditions. An acoustic model, such as the one shown in FIG. 7, can be used to predict the effect of the resonator assembly 48 on the outlet admittance of a resonator under various operational conditions. Thus, it may be possible that a single resonator assembly can be used to reduce pressure pulsations to non-damaging levels under various conditions, such as during both startup and base-load operation.

The foregoing description is provided in the context of system for minimizing the acoustic admittance of the fuel flow as it exits the fuel flow passage. Of course, aspects of the invention can be employed with respect to myriad combustors and fuel delivery systems, including all of those described above, as one skilled in the art would appreciate. Thus, it will of course be understood that the invention is not limited to the specific details described herein, which are given by way of example only, and that various modifications and alterations are possible within the scope of the invention as defined in the following claims.

What is claimed is:

1. An acoustically stiffened fuel supply system for a turbine engine comprising:
    at least one turbine engine combustion chamber;
    a fuel supply passage for receiving a pressurized gas fuel therein, the passage having a outlet adapted to discharge fuel into the combustion chamber, the fuel supply passage being defined at least in part by a t-shaped pipe having an open inlet end, an opposing open outlet end and an open branch end disposed therebetween, the t-shaped pipe having an internal passage, wherein the fuel in the passage has an associated volume velocity wave and an associated pressure wave, the pressure wave being substantially 90 degrees out of phase with the volume velocity wave;
    a plug having a plurality of openings therein, the plug being secured to the branch end so as to substantially close the open branch end, the plug including an inner surface and an outer surface, wherein the inner surface includes at least one baffle extending therefrom, whereby the baffle reduces grazing flow of fuel over the inner surface of the plug; and
    a housing enclosing at least a portion of the branch end so as to define a volume therebetween, wherein the openings permit fluid communication between the internal passage of the t-shaped pipe and the volume and wherein the openings are the only manner of fluid communication with the volume, whereby a resonator assembly is formed,
    wherein the resonator shifts the pressure wave in the fuel supply passage such that a pressure antinode occurs substantially at the outlet, whereby the volume velocity wave amplitude of the fuel is reduced at the passage outlet, such that the combustion oscillations in the combustor that are attributable to the fuel passage are suppressed.

2. The system of claim 1 wherein the fuel supply passage is defined by at least a fuel supply line and a fuel nozzle, wherein the fuel nozzle is located downstream of the fuel supply line and has a discharge face that defines the outlet of the fuel supply passage.

3. The system of claim 2 wherein the resonator assembly is provided between the fuel supply line and the fuel nozzle.

4. The system of claim 2 wherein the resonator assembly is located in the fuel supply line upstream of the fuel nozzle.

5. The system of claim 1 wherein the combustor is a diffusion-type combustor.

6. The system of claim 1 wherein at least a portion of the plug is received within the branch end.

7. The system of claim 1 wherein the volume velocity wave amplitude is reduced to substantially zero substantially at the outlet.

8. A resonator for a turbine engine fuel supply line comprising:
    a t-shaped pipe having opposing inlet and outlet ends and an open branch end disposed therebetween, the t-shaped pipe having an internal passage;
    a plug having a plurality of openings therein, the plug being secured to the branch end so as to substantially close the open branch end; and a housing enclosing at least a portion of the branch end so as to define a volume therebetween, wherein the openings in the plug permit fluid communication between the internal passage of the t-shaped pipe and the volume and wherein the openings are the only manner of fluid communication with the volume.

9. The resonator of claim 8 wherein the inlet and outlet ends are adapted for fluid connection to a fuel passage.

10. The resonator of claim 8 wherein at least a portion of the plug is received within the branch end.

11. The resonator of claim 8 wherein the plug includes an inner surface and an outer surface, wherein the inner surface includes at least one baffle extending therefrom, whereby the baffle reduces grazing flow over the inner surface of the plug.

12. The resonator of claim 11 wherein the openings in the plug are offset from the baffle.

13. The resonator of claim 8 wherein at least a portion of the housing is thermally insulated.

14. The resonator of claim 8 wherein the openings in the plug are configured to provide acoustic stiffening at a specified frequency.

15. The resonator of claim 8 wherein the branch end is substantially perpendicular to the inlet and outlet ends.

* * * * *